No. 695,262. Patented Mar. 11, 1902.
G. H. ZEAL.
MAXIMUM THERMOMETER.
(Application filed Oct. 30, 1901.)
(No Model.)

UNITED STATES PATENT OFFICE.

GILES H. ZEAL, OF LONDON, ENGLAND.

MAXIMUM THERMOMETER.

SPECIFICATION forming part of Letters Patent No. 695,262, dated March 11, 1902.

Application filed October 30, 1901. Serial No. 80,544. (No model.)

*To all whom it may concern:*

Be it known that I, GILES HENRY ZEAL, a subject of the King of Great Britain, residing at London, England, have invented certain new and useful Improvements in Maximum Thermometers, of which the following is a full, clear, and exact description, and for which I have made application for patent in Great Britain dated the 1st day of October, 1901.

In clinical and other maximum thermometers as formerly constructed a difficulty is experienced in returning the indicating column or index to its normal position. Attempts have been made to remedy this inconvenience by the provision of a body of air in a chamber at the upper end of the tube closed by a flexible diaphragm, of india-rubber or the like, acted upon by a piston or plunger or by the finger. It has also been proposed to form an air-chamber of glass at the upper end of the tube and to hermetically seal such chamber by the blowpipe. With this latter form it was necessary to use heat to expand the air within the chamber to cause it to exert a pressure on the indicating column or index to return the latter to its normal position. These attempts, however, have not been entirely satisfactory, as the comparatively large body of air contained in the chamber at the upper end of the tube and in the tube itself causes oxidation of the mercury and leads to errors of indication, in addition to which such air is liable to be expanded unduly by heat, and thus exert a pressure on the indicating column or index of mercury when not required. According to my invention I overcome these inconveniences in the following manner and as represented in the accompanying drawings as applied to a clinical thermometer, in which—

Figure 1:
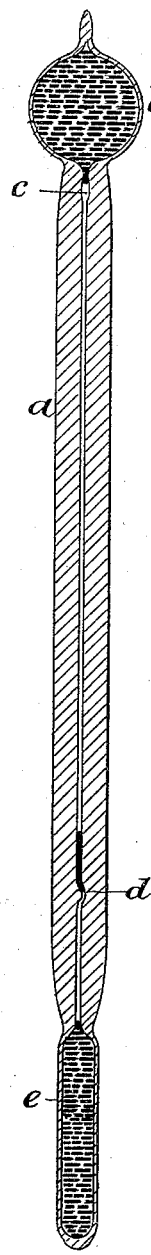
Figure 2:
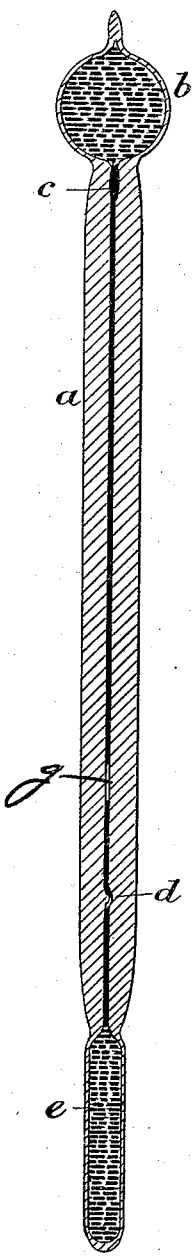
Figure 3:
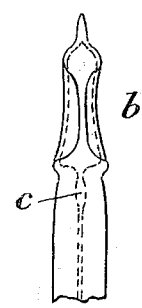
Figure 4:
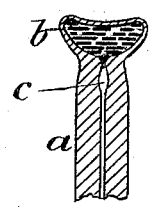
Figure 5:
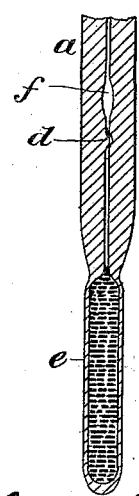

Figure 1 is a longitudinal section of my improved thermometer, showing the instrument in its normal condition and ready for taking a temperature. Fig. 2 is a similar section showing the instrument as it would be when after a temperature has been taken and noted the indicating column or index is being returned below the scale in readiness for another temperature to be taken. Fig. 3 is an elevation of the upper part of the thermometer drawn at right angles to Figs. 1 and 2. Fig. 4 is a longitudinal section of the upper part of a thermometer, showing a slight modification; and Fig. 5 is a longitudinal section of the lower part of a thermometer, showing another modification.

According to my invention I form by means of a blow-pipe and attach to the upper end of the thermometer-tube $a$ a compressible glass chamber $b$, which I supply with mercury and seal by means of the blowpipe. Below the compressible chamber $b$ I form a smaller chamber $c$ by expanding the bore of the tube $a$ for the purpose of receiving any mercury which may be caused to leave the compressible chamber $b$ through the action of heat.

$d$ is the ordinary constriction of the bore to cut off a portion of the mercurial column to form a maximum index, (but other methods of obtaining a maximum index may be used,) and $e$ is an ordinary mercury-bulb.

The compressible chamber $b$ may be of any suitable shape, that shown at Figs. 1, 2, 3 being preferred, in which case the chamber $b$ is compressed by the thumb and finger. When, however, such a form as that shown at Fig. 4 is adopted, the thermometer may be held in the hand and a single finger used to press on the top of the chamber $b$.

In some cases I form, just above the constriction $d$, a small chamber $f$ by expanding the bore of the tube $a$, so that in the event of the observer forcing the mercury in the chamber $b$ farther than necessary the excess of mercury shall accumulate in such chamber $f$ and not follow the index past the constriction $d$.

I would here remark that a small quantity of a gaseous body is introduced into the thermometer between the two bodies of mercury to keep them apart, as shown at $g$ in Fig. 2.

By my improved thermometer after the indicating column or index has risen to the maximum it may after observation be returned to its normal position by applying pressure to the elastic portion of the compressible chamber $b$.

After taking a temperature the mercurial column which formed the maximum index need only be forced down until the top thereof is below the scale, after which the contraction of the mercury in the bulb $e$ by reduction of temperature may leave a vacant space in the bore below the constriction $d$ and a portion of the mercury which formed the maximum scale above said restriction, as shown in Fig. 1, as in the common mode of using maximum thermometers. When a temperature is to be taken, the mercury in the bulb expands, as is well known, rises into contact with the small quantity of mercury above the constriction $d$, and raises it to the maximum degree to form an index. Then by compressing the chamber $b$ mercury therefrom is forced into the bore and acts upon the index to return the latter below the scale, the two bodies of mercury being kept apart by the gaseous body $g$ between them. After this on relieving the chamber $b$ from pressure this expands and the mercury in the bore above the gaseous body $g$ returns to said chamber $b$.

What I claim as my invention, and desire to secure by Letters Patent, is—

1. A maximum thermometer having a compressible glass chamber at its upper end charged with mercury and sealed by the blowpipe, substantially as herein set forth and for the purpose stated.

2. In a maximum thermometer having a mercury-bulb, a tube communicating therewith, and means for registering the maximum temperature in said tube, the combination therewith of a compressible glass chamber at the upper end of the tube and communicating therewith, a charge of mercury in said compressible chamber, and a small quantity of a gaseous body between the two bodies of mercury, substantially as herein set forth.

3. In a maximum thermometer having a mercury-bulb, a tube communicating therewith, and means for registering the maximum temperature in said tube, the combination therewith of a compressible glass chamber at the upper end of the tube and communicating therewith, a charge of mercury in said compressible chamber, a small quantity of a gaseous body between the two bodies of mercury, and a small chamber or enlargement in the bore of the tube just below the compressible chamber, substantially as herein set forth.

4. In a maximum thermometer having a mercury-bulb, a tube communicating therewith, and means for registering the maximum temperature in said tube, the combination therewith of a compressible glass chamber at the upper end of the tube and communicating therewith, a charge of mercury in said compressible chamber, a small quantity of a gaseous body between the two bodies of mercury, a small chamber or enlargement in the bore of the tube just below the compressible chamber, and another small chamber or enlargement in the bore of the tube a little above the constriction, substantially as herein set forth.

5. In a maximum thermometer having a mercury-bulb, a tube communicating therewith, and means for registering the maximum temperature in said tube, the combination therewith of a compressible glass chamber at the upper end of the tube and communicating therewith, a charge of mercury in said compressible chamber, a small quantity of a gaseous body between the two bodies of mercury, and a small chamber or enlargement of the tube a little above the constriction, substantially as herein set forth.

In testimony whereof I affix my signature in presence of two witnesses.

G. H. ZEAL.

Witnesses:
B. J. B. MILLS,
CLAUDE K. MILLS.